United States Patent
Okada et al.

(10) Patent No.: US 6,218,335 B1
(45) Date of Patent: Apr. 17, 2001

(54) SPINEL TYPE COMPOUND OXIDE AND METHOD OF MANUFACTURING THE SAME

(75) Inventors: Yoshimi Okada; Kenichi Imagawa; Susumu Yamamoto, all of Yokohama (JP)

(73) Assignee: Chiyoda Corporation, Kanagawa (JP)

( * ) Notice: Subject to any disclaimer, the term of this patent is extended or adjusted under 35 U.S.C. 154(b) by 0 days.

(21) Appl. No.: 09/359,134

(22) Filed: Jul. 23, 1999

(30) Foreign Application Priority Data

Jul. 24, 1998 (JP) .................................................. 10-208751

(51) Int. Cl.[7] ...................................................... B01J 23/02
(52) U.S. Cl. .......................... 502/340; 502/341; 502/344; 502/345; 502/355; 502/414; 502/415; 502/439; 502/524; 423/604; 423/622; 423/624; 423/625; 423/628; 423/635; 501/80; 501/94; 501/108; 501/118; 501/119; 501/120; 501/123; 501/125; 501/153
(58) Field of Search .................................... 502/340, 341, 502/344, 345, 355, 414, 415, 524, 439; 423/592, 604, 622, 624, 625, 628, 635; 501/80, 94, 108, 118, 120, 123, 153, 125, 119

(56) References Cited

U.S. PATENT DOCUMENTS

| | | | |
|---|---|---|---|
| 3,899,577 | * 8/1975 | Sugier | 423/656 |
| 4,377,566 | * 3/1983 | Bachelard et al. | 423/631 |
| 4,400,431 | * 8/1983 | Henslee et al. | 428/402 |
| 4,472,532 | * 9/1984 | Mooi | 502/302 |
| 4,537,872 | * 8/1985 | Ohmori et al. | 502/230 |
| 4,725,417 | * 2/1988 | Deschamps et al. | 423/244 |
| 4,963,520 | * 10/1990 | Yoo et al. | 502/64 |
| 4,968,660 | * 11/1990 | Tijburg et al. | 502/303 |
| 5,219,816 | * 6/1993 | Zhou et al. | 502/223 |
| 6,001,241 | * 12/1999 | Gosling et al. | 208/65 |

* cited by examiner

Primary Examiner—Steven P. Griffin
Assistant Examiner—Cam N. Nguyen
(74) Attorney, Agent, or Firm—Armstrong, Westerman, Hattori, McLeland & Naughton LLP

(57) ABSTRACT

A porous spinel type oxide shows a large surface area and a uniform micro-porous structure. The oxide is expressed by general formula $MO$—$Al_2O_3$ and shows a surface area per unit weight of not less than 80 m$^2$/g. Such a porous spinel type compound oxide is obtained by impregnating a specific γ-alumina carrier with a solution of a compound of metal element M capable of taking a valence of 2, drying the impregnated carrier and calcining it at a temperature of 600° C. or higher. The specific γ-alumina carrier shows a surface area per unit weight of not less than 150 m$^2$/g, a micro-pore volume per unit weight of not less than 0.55 cm$^3$/g and an average micro-pore diameter between 90 and 200 angstroms. The micro-pores with a diameter between 90 and 200 angstroms occupy not less than 60% of the total micro-pore volume of the carrier.

8 Claims, 8 Drawing Sheets

FIG.3  X-RAY DIFFRACTION PATTERN OF POROUS ZnO-Al$_2$O$_3$

US 6,218,335 B1

SPINEL TYPE COMPOUND OXIDE AND METHOD OF MANUFACTURING THE SAME

BACKGROUND OF THE INVENTION

1. Field of the Invention

This invention relates to a porous compound oxide to be suitably used as catalyst or adsorbent or as a carrier thereof and, more specifically, it relates to a spinel type compound oxide expressed by general formula MO—$Al_2O_3$ (M representing a metal atom with a valence of 2).

2. Related Background Art

The spinel structure refers to a typical crystal structure observable in double oxides having a composition of $AB_2O_4$ (both A and B representing a metal element). The denomination of spinel derives from that of a mineral compound (a double oxide of magnesium and aluminum expressed by chemical formula $MgAl_2O_4$) showing the above structure and determined to be as such for the first time. A compound having a spinel structure forms a crystal showing an octahedral profile that belongs to the cubic lattice (having eight chemical units of $AB_2O_4$ in a unit lattice) containing oxygen atoms substantially to the cubic closest packing (The Large Chemical Dictionary: Kyoritsu Shuppan, vol.5, p. 171). Compounds having the spinel structure are stable over a wide temperature range and remain stable in a relatively hot environment so that such compounds are used for sealing materials to be used at high temperature (see, for example, Japanese Patent Application Laid-Open No. 9-153369). Porous spinel type oxides, on the other hand, are popularly used for catalysts and adsorbents and also as carriers thereof. Japanese Patent Application Laid-Open No. 9-225267 discloses magnesium oxide-copper oxide-aluminum oxide spinel that can be used for catalytically reducing the nitrogen oxide contained in exhaust gas discharged from internal combustion engines and thermoelectric power plants. Japanese Patent Application Laid-Open No. 9-192490 discloses an alumina type compound oxide containing at least an element selected from cobalt, nickel and zinc and having a spinel structure in order to provide an exhaust gas purifying catalyst showing a heat resistance and an activation promoting effect much more excellent than known alumina type compound oxides. Japanese Patent Application Laid-Open No. 9-276699 discloses a hydrogenation catalyst precursor containing as principal ingredient a compound oxide having a copper-aluminum spinel structure, a hydrogenation catalyst using the same and a method of manufacturing alcohol using such a hydrogenation catalyst in order to provide a hydrogenation catalyst precursor free from the problem of environmental contamination of copper-chromium catalysts and more excellent than known copper-iron-aluminum catalysts in terms of activity, durability and selectivity as well as a hydrogenation catalyst and a method of manufacturing alcohol using such a catalyst.

When using a porous spinel type oxide as catalyst or adsorbent or a carrier thereof, the prepared catalyst or adsorbent or the carrier thereof importantly has to show a large surface area in order to raise its activity and adsorbing ability. Additionally, when it is used as catalyst, it is required to have a uniform surface in terms of characteristic properties in order to enhance its selectivity and suppress degradation of its activity. Therefore, it is required to show little change during its use in terms of surface area and characteristic properties. Now, spinel type oxides are structurally relatively stable over a wide temperature range and hence show little change in terms of surface area and characteristic properties in use so that they can advantageously be used in a high temperature environment. However, in order for spinel type crystal to grow, generally it will have to be calcined at high temperature. If the material to be calcined is porous, it may not be able to maintain a large surface area and a uniform micro-porous structure under such a high temperature condition and consequently the surface area will inevitably become reduced in use. Currently, this problem can be avoided only by using it by a relatively large volume. Thus, there is a demand for a porous spinel type oxide showing a large surface area that is made of a material whose surface area may not be reduced remarkably if it is calcined at high temperature to make it show a spinel structure.

SUMMARY OF THE INVENTION

Therefore, it is the object of the present invention to provide a porous spinel type oxide showing a large surface area and a uniform micro-porous structure.

According to the invention, the above object is achieved by providing a porous spinel type compound oxide showing a surface area per unit weight of not less than 80 $m^2/g$ and being expressed by general formula MO—$Al_2O_3$, which is obtained by impregnating a γ-alumina carrier with a solution of a compound of metal element M capable of taking a valence of 2, drying the impregnated carrier and calcining it at temperature of 600° C. or higher, said carrier showing a surface area per unit weight of not less than 150 $m^2/g$, a micro-pore volume per unit weight of not less than 0.55 $cm^3/g$ and an average micro-pore diameter between 90 and 200 angstroms, the micro-pores with a diameter between 90 and 200 angstroms thereof taking not less than 60% of the total micro-pore volume.

DESCRIPTION OF THE PREFERRED EMBODIMENTS

Figure 1:
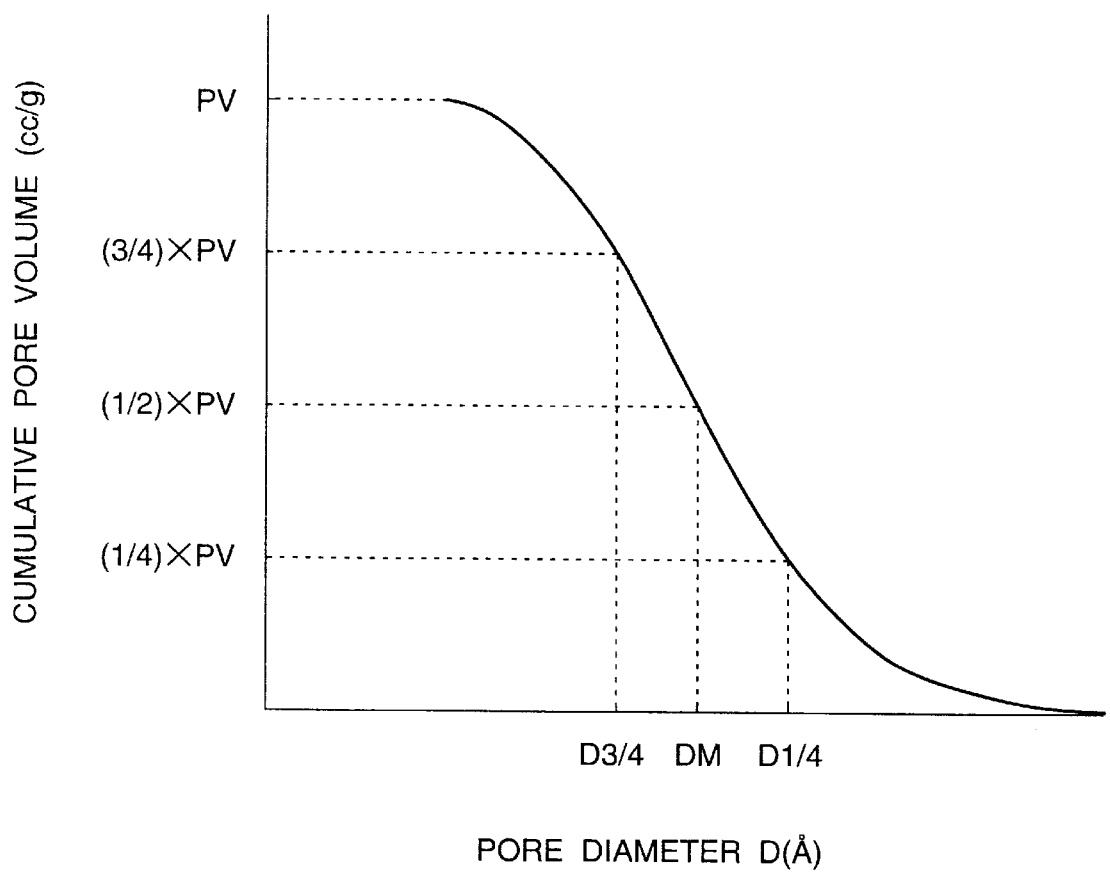
FIG. 1 shows a cumulative pore-size distribution curve obtained by means of a mercury porosimeter.

According to the invention, a desired porous spinel type oxide can be prepared by using a specific γ-alumina carrier as starting material. Such a γ-alumina carrier shows a surface area per unit weight of not less than 150 $m^2/g$, a micro-pore volume per unit weight of not less than 0.55 $cm^3/g$ and an average micro-pore diameter between 90 and 200 angstroms and the micro-pores with a diameter between 90 and 200 angstroms thereof occupies not less than 60% of the total micro-pore volume. If the average micro-pore diameter is less than 90 angstroms, the intra-pore diffusion of alkane molecules and alkene molecules will be rate-controlling to make it impossible to effectively utilize the overall surface area of the catalyst. If, to the contrary, the average micro-pore diameter exceeds 200 angstroms, the overall surface area will not be satisfactorily large enough. U.S. Pat. No. 4,248,852 and Japanese Patent Publication No. 6-72005 describes a method of manufacturing a γ-alumina carrier that meets the above requirements. According to the disclosed method, aluminum hydroxide slurry obtained by neutralizing an aluminum salt is washed by filtration, dehydrated and dried before it is calcined at 400° C. to 800° C. for 1 to 6 hours to produce a carrier.

The above specific porous γ-alumina carrier is impregnated with a solution of a compound of a metal element capable of taking a valence of 2. Metals capable of taking a valence of 2 include metal elements of the 2A group of the periodic table including beryllium, magnesium, calcium, strontium, barium and radium, those of the 2B group of the periodic table including zinc, cadmium and mercury and transition metals including chromium, manganese, iron, cobalt, nickel and copper. A compound to be used for the purpose of the invention is preferably soluble to water and/or organic solvents such as methanol and acetone. Such compounds include inorganic salts such as chlorides, bromides and acetates of the above listed metal elements, hydrates of such inorganic salts and organic salts such as acetylacetonate complexes, methylates, ethylates, butylates and phenylates.

Subsequently, the solvent is removed from the above described specific γ-alumina carrier impregnated with a solution of a metal element capable of taking a valence of 2 by an appropriate means. Methods that can be used for removing the solvent include a method of allowing the carrier to stand at room temperature until the solvent moves out by itself, a method of drying the carrier in a thermostated tank held to a high temperature level and a method of drying the carrier in an evaporator under reduced pressure.

Then, the dried carrier is calcined at temperature of 400° C. or higher, preferably 600° C. or higher. The calcination can be conducted in any ordinary calcining apparatus comprising an electric furnace. Air may be used for the atmosphere of the calcination and made to flow in order to efficiently remove the decomposition product of the compound with which the carrier is impregnated. The calcination is made to continue for more than 3 hours, preferably more than 10 hours. The duration of the calcination may be relatively short when the calcining temperature is high, whereas it may be long when the calcining temperature is low.

Porous spinel type compound oxides obtained according to the present invention have a sharp pore-size distribution, which can be represented by the below-described calculation based on the cumulative pore-size distribution curve.

By referring to the cumulative pore-size distribution curve (FIG. 1) obtained by means of a mercury porosimeter, the points representing cumulative pore volumes of 3/4PV, 1/2PV and 1/4PV wherein PV represents the total pore volume are identified on the axis of ordinates as a cumulative pore volume gauge. The pore diameter giving the cumulative pore volume of 1/2PV is a point dividing the total pore volume into two equal volumes, one being the volume of micro-pores having a diameter smaller than the value of the point and the other being the volume of micro-pores having a diameter larger than that value, that is the so-called 'median' value of the pore volume distribution regarding the pore size (hence hereinafter referred to as "median diameter" and used as a central value of the pore diameter). Next, the points 3/4PV, 1/2PV and 1/4PV are projected onto the axis of abscissas as a pore diameter gauge via the cumulative pore-size distribution curve and the pore diameters D3/4, D1/2 (i.e. median diameter) and D1/4 corresponding respectively to the points, whereby the relative half-width is determined according to the following equation:

Relative Half-width (-)=(D1/4-D3/4)/Median Diameter

The sharpness of the pore-size distribution can be represented by the pore-size distribution evaluating factor as illustrated below:

Pore-size distribution evaluating factor P=Relative half-width (-)/ Total pore volume (cc/g—$Al_2O_3$)/Median diameter (Å)

You should use the value based on the unit weight of alumina for the total pore volume in the above equation, when the pore-size distribution evaluating factor is compared between an alumina carrier and a spinel type compound oxide carrier made from the alumina carrier.

Porous spinel type compound oxides according to the invention generally show a pore-size distribution evaluating factor P within the range between 0.001 and 0.005. It should be noted here that a smaller value of the pore-size distribution evaluating factor represents a sharper pore-size distribution.

Unlike the specific gamma-alumina used in the present invention, alumina carriers obtained by conventional precipitation methods have a broader pore-size distribution. Such alumina carriers can not sufficiently be made into a spinel structure when they are calcined. There may also be caused other problems including that substantial part of micro-pores are clogged with metal oxides formed from impregnated metal-containing solutions to thereby afford generally a small pore volume. On the other hand, when a spinel type compound oxide is obtained by mixing finely divided gamma-alumina powder with divalent metal oxide powder and then calcining the mixture at a high temperature, it is still difficult to provide a uniform structure because the spinel structure is being formed as powder particles are sintered with each other, and therefore, such a spinel type compound oxide will generally have a small pore volume and a small surface area. Thus, the specific gamma-alumina to be used in the invention play a role in promoting structural conversion of the crystal to a spinel structure.

Now, examples of porous spinel type oxide prepared by impregnating a specific γ-alumina carrier with respective compounds of different metals with a valence of 2, then drying and calcining it will be discussed below. Note that all the % values below refer to those of weight %.

EXAMPLES 1–6
(1) Preparation of γ-alumina Carrier

A γ-alumina carrier was prepared by a method described in Example 1 of Japanese Patent Publication No. 6-72005 in a manner as summarily described below. A suspension (pH 10) of aluminum hydroxide slurry was obtained by adding aqueous solution of sodium aluminate instantaneously to hot and dilute sulfuric acid that was being agitated vehemently. Then, using the suspension as seed aluminum hydroxide, hot and dilute sulfuric acid and aqueous solution of sodium aluminate were added thereto alternately and periodically, while continuously agitating the suspension, and the obtained final suspension was filtered and washed to produce a cake, which was then subjected to an extrusion molding operation. The molded product was subsequently dried and calcined at 500° C. for 3 hours to produce a γ-alumina carrier. The obtained γ-alumina carrier showed the physical properties as listed in Table 1 below.

TABLE 1

| average micro-pore diameter | 119 angstroms |
| pore volume | 0.713 cm³/g |
| surface area | 240 m²/g |
| percentage ratio of pores with a diameter of 90 to 200 angstroms relative to the entire pore volume | 88% |

(2) Preparation of Porous Spinel Type MgO—$Al_2O_3$ Compound Oxide (EXAMPLE 1)

Figure 2:
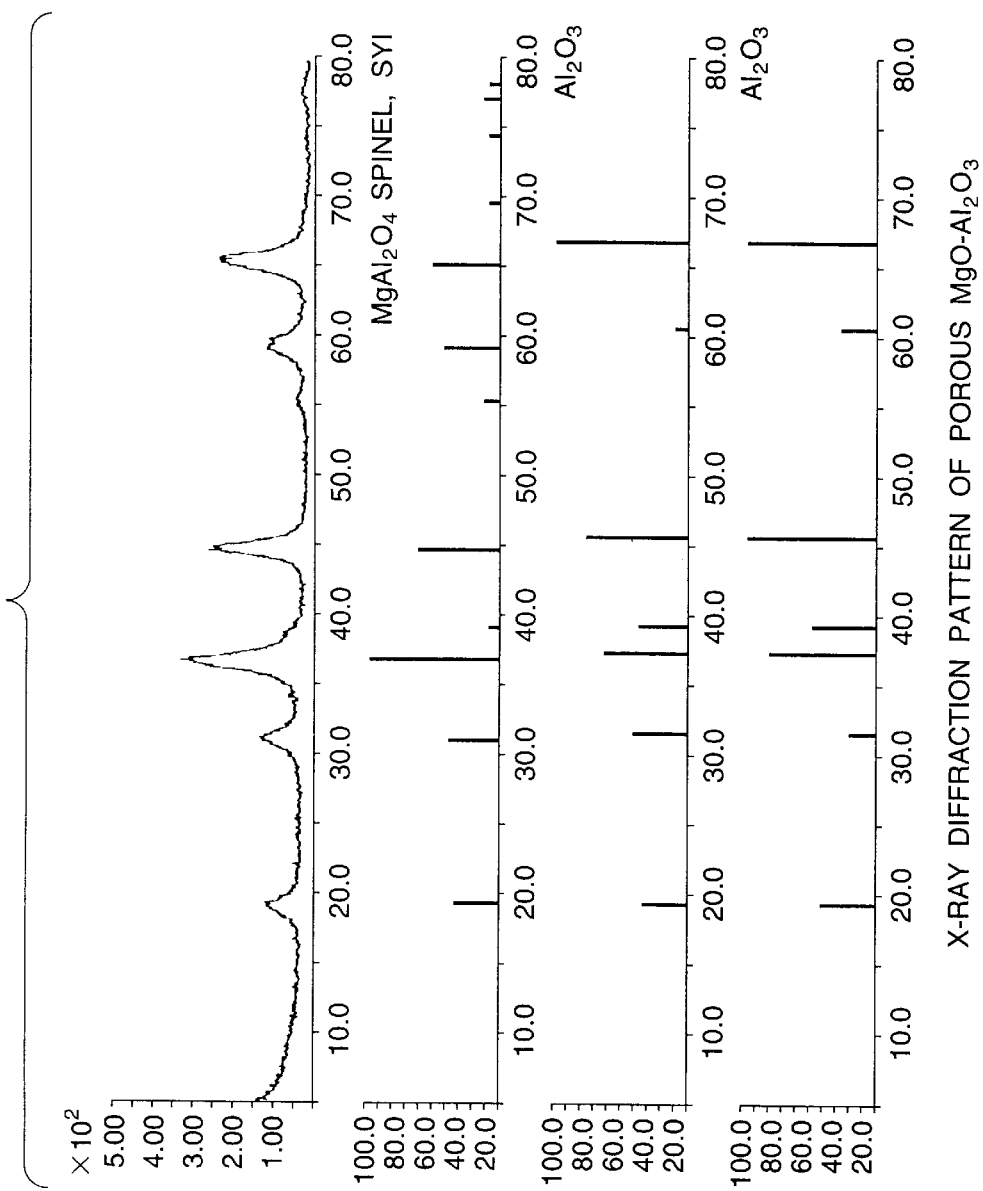
FIG. 2 is an X-ray diffraction pattern of porous MgO—$Al_2O_3$.

10.0 g of the above γ-alumina carrier was impregnated with 10% aqueous solution of magnesium nitrate $Mg(NO_3)_2$ until the ratio by weight of $MgO/Al_2O_3$ reached to 14/86. Then, the moisture was removed therefrom and the dried product was calcined at 800° C. for 100 hours to produce a compound carrier., Table 2 below and FIG. 2 summarily show the results of an observation of the compound carrier obtained by utilizing X-ray diffractometry (XRD). Table 2 shows the relationship between the incident angle 2θ and the relative intensity to the highest peak. FIG. 2 shows the diffraction pattern of XRD. As seen from Table 2 and FIG. 2, the compound carrier had a spinel structure of $MgAl_2O_4$.

TABLE 2

| 2θ (deg) | relative intensity (%) |
|---|---|
| 19.3 | 28.9 |
| 31.5 | 31.0 |
| 36.6 | 81.9 |
| 37.1 | 100.1 |
| 39.2 | 4.1 |
| 45.0 | 79.6 |
| 55.9 | 8.5 |
| 59.6 | 33.9 |
| 65.8 | 38.2 |
| 66.1 | 76.3 |
| 78.1 | 5.5 | ray source: $Cu-K_{a1}$ (3) Preparation of Porous Spinel Type $ZnO$—$Al_2O_3$ Compound Oxide (EXAMPLE 2)

Figure 3:
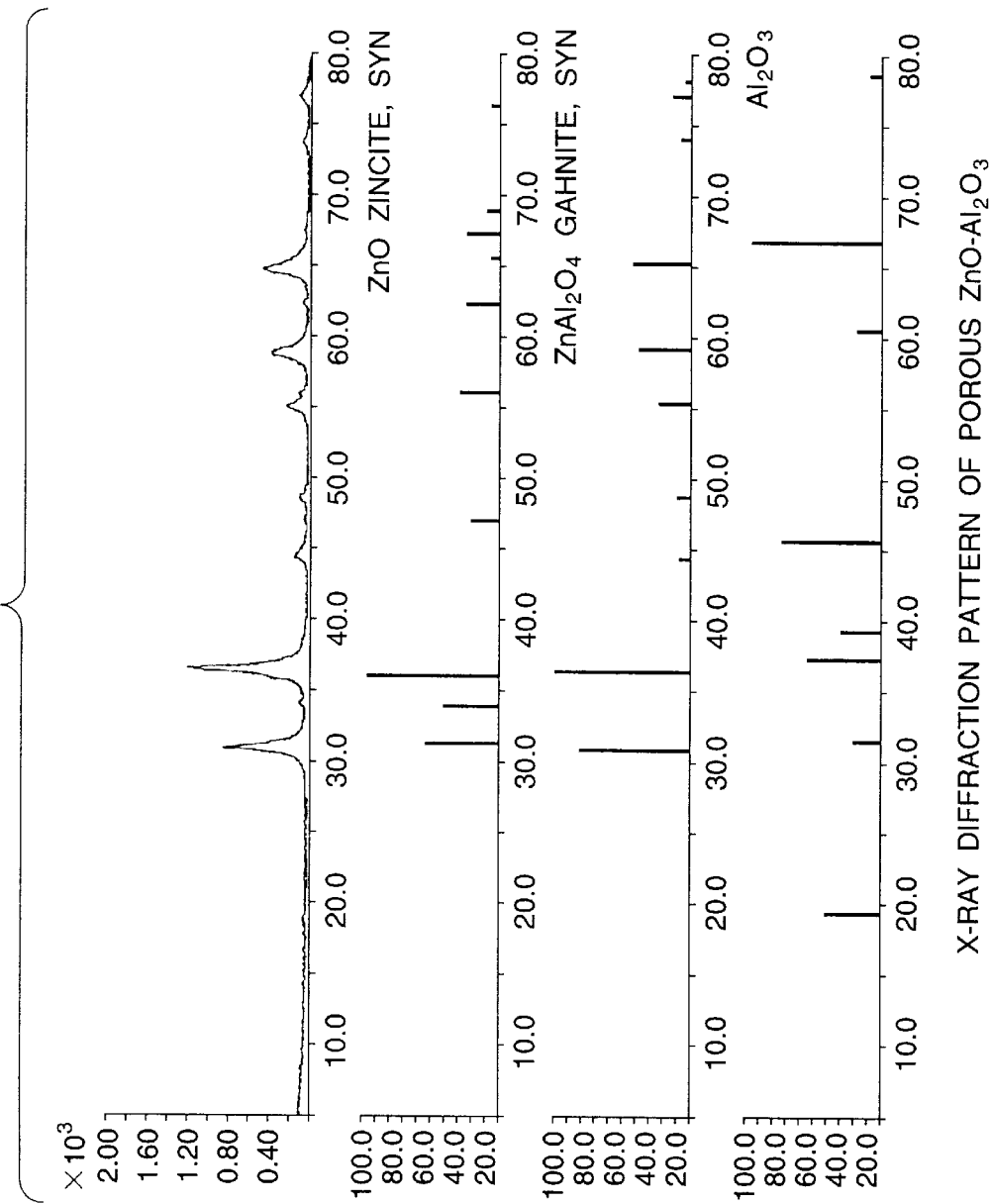
FIG. 3 is an X-ray diffraction pattern of porous ZnO—$Al_2O_3$.

27.5 g of the above γ-alumina carrier was impregnated with 30% aqueous solution of zinc nitrate $Zn(NO_3)_2$ until the ratio by weight of $ZnO/Al_2O_3$ reached to 35/65. Then, the moisture was removed therefrom and the dried product was calcined at 800° C. for 170 hours to produce a compound carrier. Table 3 below and FIG. 3 summarily show the results of an observation of the compound carrier obtained by utilizing X-ray diffractometry (XRD). Table 3 shows the relationship between the incident angle 2θ and the relative intensity to the highest peak. FIG. 3 shows the diffraction pattern of XRD. As seen from Table 3 and FIG. 3, the compound carrier had a spinel structure of $ZnAl_2O_4$.

TABLE 3

| 2θ (deg) | relative intensity (%) |
|---|---|
| 19.0 | 1.7 |
| 31.3 | 68.3 |
| 34.5 | 5.0 |
| 36.3 | 31.4 |
| 36.9 | 100.0 |
| 44.9 | 11.2 |
| 47.6 | 2.8 |
| 49.2 | 7.0 |
| 49.8 | 2.2 |
| 55.7 | 17.1 |
| 59.4 | 30.7 |
| 63.0 | 2.7 |
| 65.4 | 38.4 |
| 68.1 | 0.9 |
| 69.2 | 0.9 |
| 74.2 | 4.8 |
| 77.5 | 7.6 | ray source: $Cu-K_{a1}$ (4) Preparation of Porous Spinel Type $NiO$—$Al_2O_3$ Compound Oxide (EXAMPLE 3)

Figure 4:
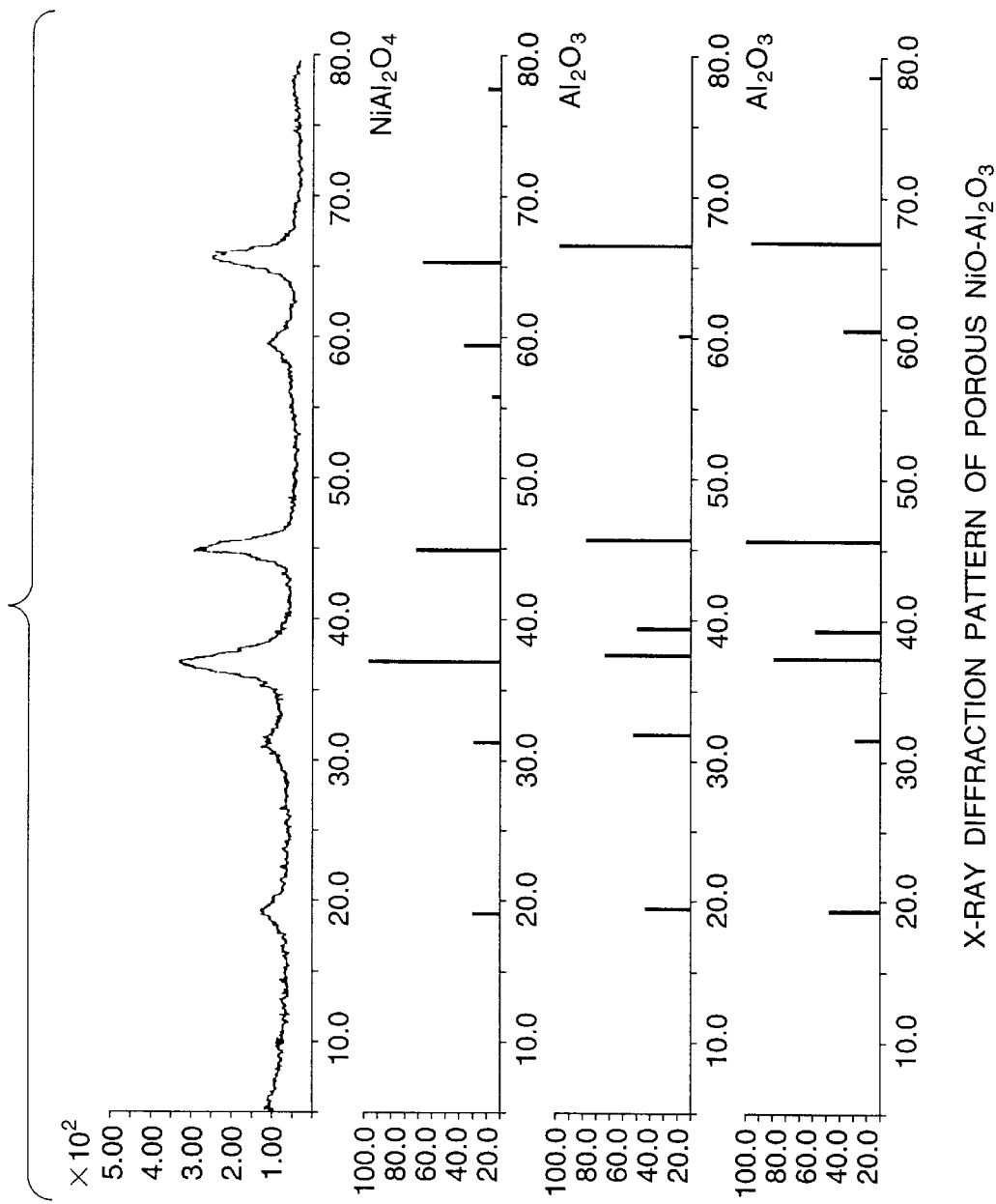
FIG. 4 is an X-ray diffraction pattern of porous NiO—$Al_2O_3$.

10.0 g of the above γ-alumina carrier was impregnated with 15% aqueous solution of nickel nitrate $Ni(NO_3)_2$ until the ratio by weight of $NiO/Al_2O_3$ reached to 23/77. Then, the moisture was removed therefrom and the dried product was calcined at 800° C. for 100 hours to produce a compound carrier. Table 4 below and FIG. 4 summarily show the results of an observation of the compound carrier obtained by utilizing X-ray diffractometry (XRD). Table 4 shows the relationship between the incident angle 2θ and the relative intensity to the highest peak. FIG. 4 shows the diffraction pattern of XRD. As seen from Table 4 and FIG. 4, the compound carrier had a spinel structure of $NiAl_2O_4$.

TABLE 4

| 2θ (deg) | relative intensity (%) |
|---|---|
| 5.5 | 8.0 |
| 19.2 | 20.1 |
| 31.3 | 18.5 |
| 36.6 | 80.5 |
| 37.1 | 100.0 |
| 45.1 | 93.7 |
| 45.7 | 63.2 |
| 56.0 | 5.3 |
| 65.9 | 21.3 |
| 76.4 | 77.1 |
| 77.8 | 6.6 | ray source: $Cu-K_{a1}$ (5) Preparation of Porous Spinel Type $CoO$—$Al_2O_3$ Compound Oxide (EXAMPLE 4)

Figure 5:
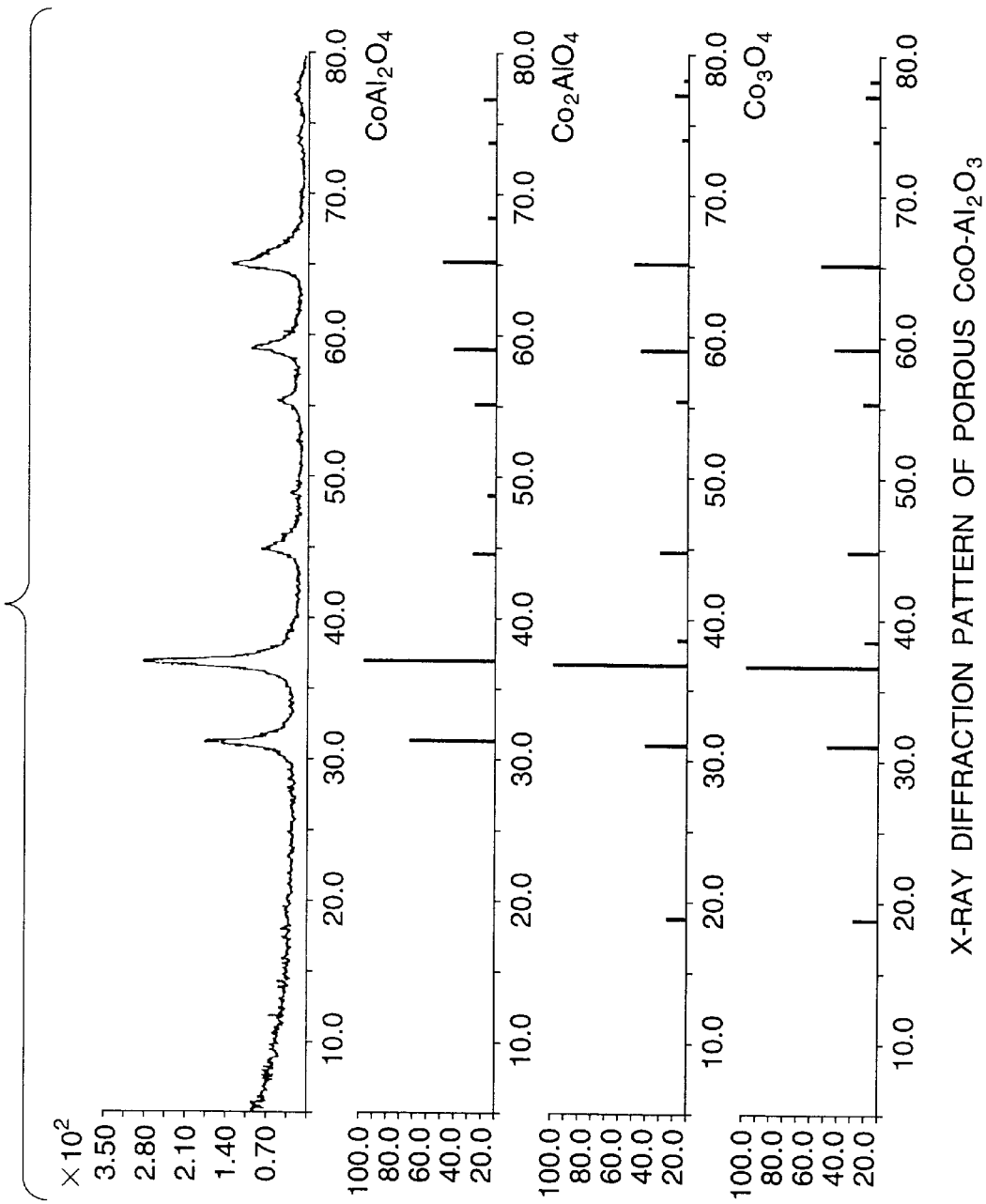
FIG. 5 is an X-ray diffraction pattern of porous CoO—$Al_2O_3$.

10.0 g of the above γ-alumina carrier was impregnated with 15% aqueous solution of cobalt nitrate $Co(NO_3)_2$ until the ratio by weight of $CoO/Al_2O_3$ reached to 23/77. Then, the moisture was removed therefrom and the dried product was calcined at 800° C. for 100 hours to produce a compound carrier. Table 5 below and FIG. 5 summarily show the results of an observation of the compound carrier obtained by utilizing X-ray diffractometry (XRD). Table 5 shows the relationship between the incident angle 2θ and the relative intensity to the highest peak. FIG. 5 shows the diffraction pattern of XRD. As seen from Table 5 and FIG. 5, the compound carrier had a spinel structure of $CoAl_2O_4$.

TABLE 5

| 2θ (deg) | relative intensity (%) |
|---|---|
| 11.8 | 5.1 |
| 19.2 | 4.1 |
| 31.3 | 57.9 |
| 36.8 | 100.0 |
| 44.8 | 21.7 |
| 49.0 | 4.3 |
| 55.7 | 15.2 |
| 59.3 | 31.3 |
| 65.3 | 46.6 |
| 74.2 | 4.1 |
| 77.3 | 6.0 | ray source: $Cu-K_{a1}$ (6) Preparation of Porous Spinel Type $CuO$—$Al_2O_3$ Compound Oxide (EXAMPLE 5)

Figure 6:
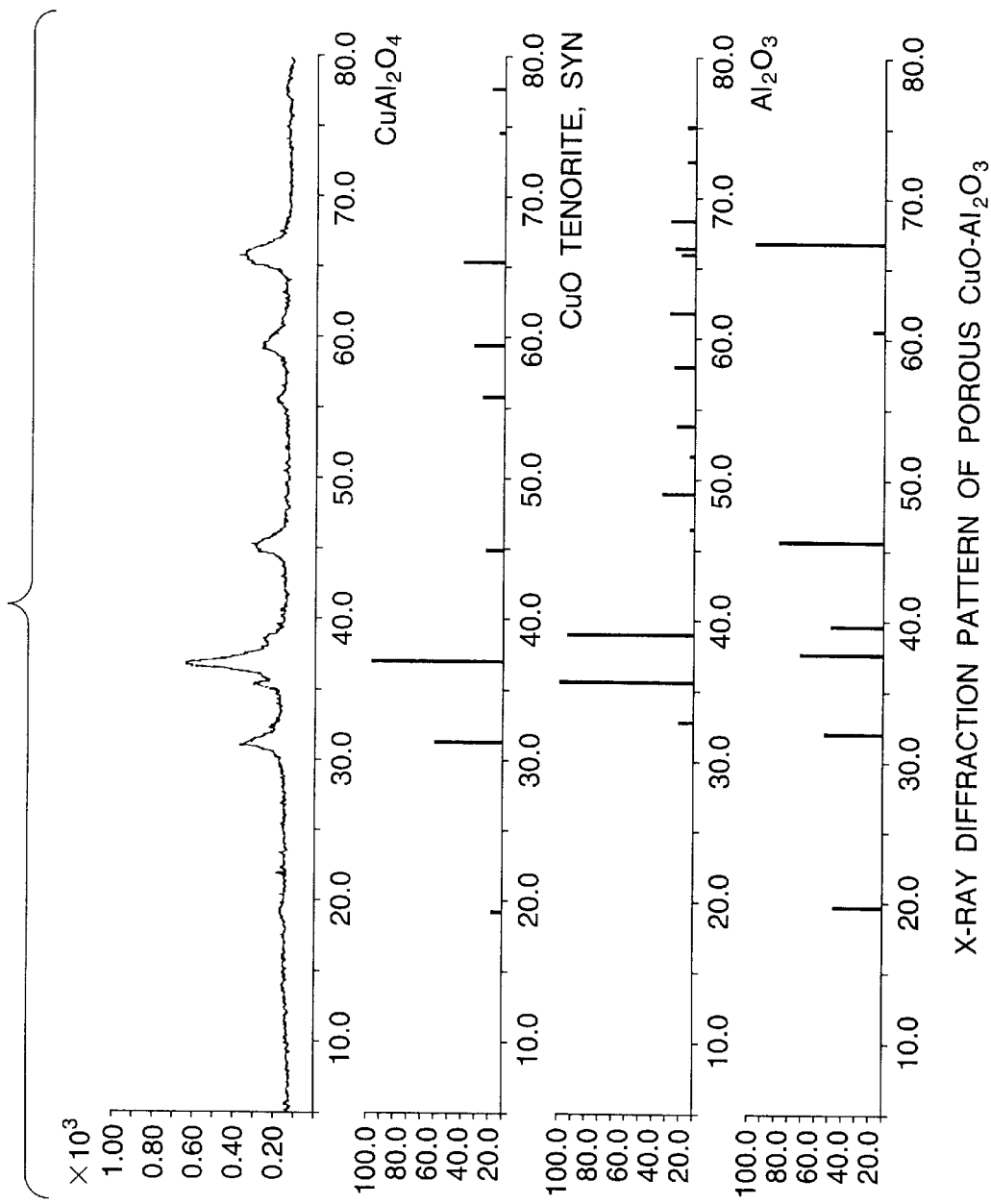
FIG. 6 is an X-ray diffraction pattern of porous CuO—$Al_2O_3$.

10.0 g of the above γ-alumina carrier was impregnated with 15% aqueous solution of copper nitrate $Cu(NO_3)_2$ until the ratio by weight of $CuO/Al_2O_3$ reached to 24/76. Then, the moisture was removed therefrom and the dried product was calcined at 800° C. for 100 hours to produce a compound carrier. Table 6 below and FIG. 6 summarily show the results of an observation of the compound carrier obtained by utilizing X-ray diffractometry (XRD). Table 6 shows the relationship between the incident angle 2θ and the relative intensity to the highest peak. FIG. 6 shows the diffraction pattern of XRD. As seen from Table 6 and FIG. 6, the compound carrier had a spinel structure of $CuAl_2O_4$.

TABLE 6

| 2θ (deg) | relative intensity (%) |
|---|---|
| 19.1 | 4.8 |
| 31.4 | 47.2 |
| 35.6 | 27.9 |
| 36.9 | 100.0 |
| 38.8 | 22.3 |
| 45.0 | 26.9 |
| 45.5 | 33.6 |
| 48.9 | 4.6 |
| 55.9 | 12.3 |
| 59.6 | 25.5 |
| 65.4 | 39.8 |
| 66.4 | 41.6 |
| 74.6 | 3.0 | ray source: Cu-K$_{a1}$ (7) Preparation of Porous Spinel Type MgO—NiO—2Al$_2$O$_3$ Compound Oxide (EXAMPLE 6)

Figure 7:
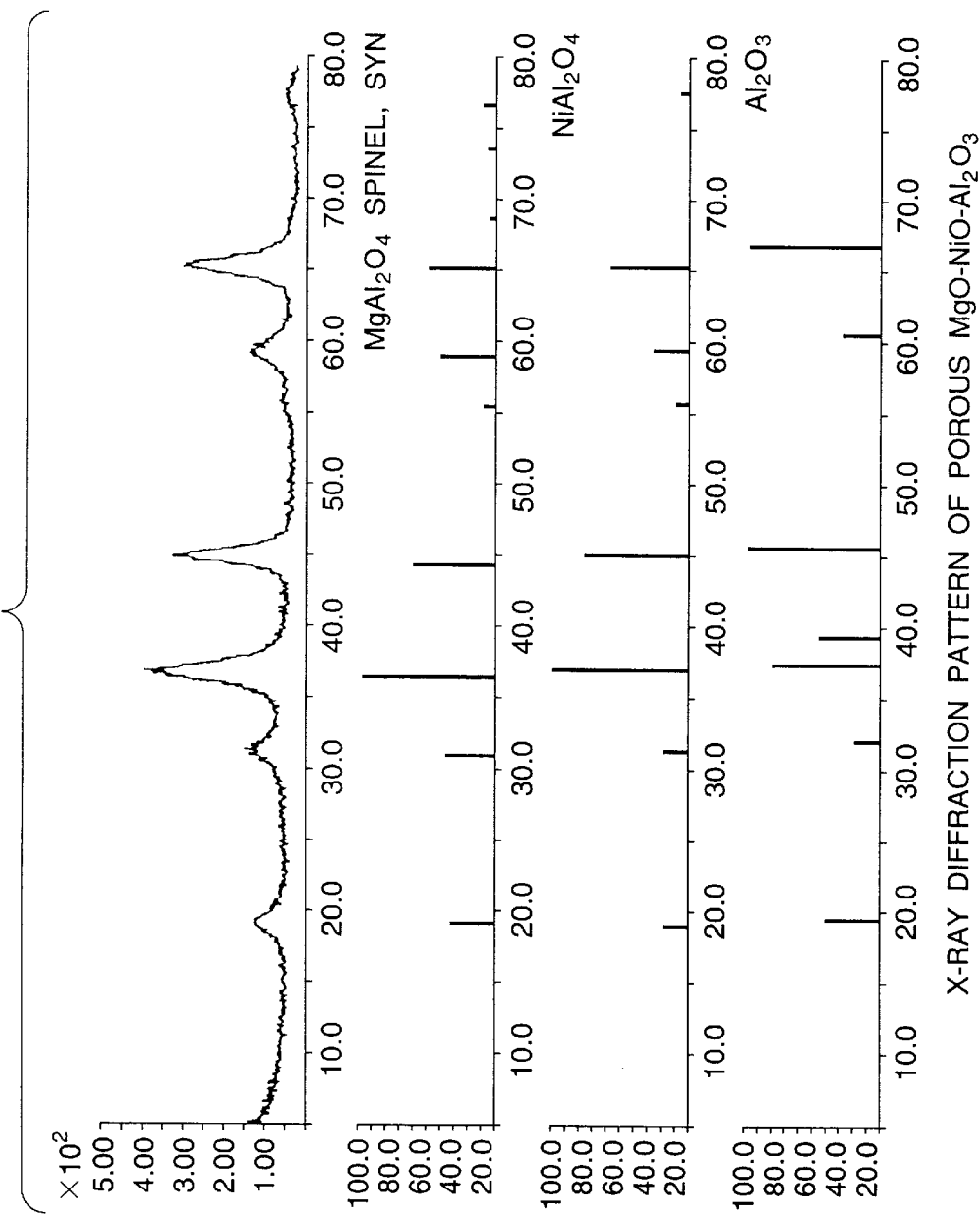
FIG. 7 is an X-ray diffraction pattern of porous MgO—NiO—$Al_2O_3$.

10.0 g of the above γ-alumina carrier was impregnated with 5% aqueous solution of magnesium nitrate Mg(NO$_3$)$_2$ and 7.5% aqueous solution of nickel nitrate Ni(NO$_3$)$_2$ until the ratio by weight of MgO/NiO/Al$_2$O$_3$ reached to 7/12/81. Then, the moisture was removed therefrom and the dried product was calcined at 800° C. for 100 hours to produce a compound carrier. Table 7 below and FIG. 7 summarily show the results of an observation of the compound carrier obtained by utilizing X-ray diffractometry (XRD). Table 7 shows the relationship between the incident angle 2θ and the relative intensity to the highest peak. FIG. 7 shows the diffraction pattern of XRD. As seen from Table 7 and FIG. 7, the compound carrier had a spinel structure of NiAl$_2$O$_4$ and MgAl$_2$O$_4$.

TABLE 7

| 2θ (deg) | relative intensity (%) |
|---|---|
| 19.3 | 25.9 |
| 31.5 | 20.6 |
| 37.0 | 100.0 |
| 45.3 | 92.8 |
| 56.2 | 5.7 |
| 60.0 | 31.2 |
| 65.9 | 85.8 |
| 78.1 | 5.7 | ray source: Cu-K$_{a1}$ (8) Observation of Physical Properties of the above Compound Carriers Table 8 below shows some of the physical properties (surface area, average micro-pore diameter, micro-pore volume) of the above six compound carriers, of which the surface area was observed by means of the BET method and the average micro-pore diameter and the micro-pore volume were observed by means of a mercury porosimeter for each of the compound carriers.

TABLE 8

| Example | compound carrier | surface area [m²/g] | average micro-pore diameter [↑] | micro-pore volume [ml/g] |
|---|---|---|---|---|
| 1 | MgO-Al$_2$O$_3$ | 150 | 110 | 0.527 |
| 2 | ZnO-Al$_2$O$_3$ | 83 | 127 | 0.400 |
| 3 | NiO-Al$_2$O$_3$ | 140 | 108 | 0.476 |
| 4 | CoO-Al$_2$O$_3$ | 110 | 124 | 0.467 |
| 5 | CuO-Al$_2$O$_3$ | 95 | 147 | 0.421 |
| 6 | MgO-NiO-Al$_2$O$_3$ | 140 | 106 | 0.514 |

EXAMPLES 7–9

Three different types of γ-alumina carrier, i.e. the same one as used in EXAMPLES 1–6 and two other types, were used for preparing porous spinel type ZnO—Al$_2$O$_3$ compound oxides. Table 9 shows some characteristics of the γ-alumina carriers used, including surface area measured by the BET method, average pore diameter and pore volume obtained by means of a mercury porosimeter, percent pore volume of pores with diameters of 90 to 200 Å relative to the total pore volume, and pore-size distribution evaluating factor.

TABLE 9

| Type of γ-alumina carrier | Type 1 | Type 2 | Type 3 |
|---|---|---|---|
| Average pore diameter (↑) | 97 | 119 | 193 |
| Pore volume (cm³/g) | 0.67 | 0.71 | 1.28 |
| Surface area (m²/g) | 190 | 240 | 180 |
| Percent pore volume of poes with a diameter of 90 to 200↑ relative to the total pore volume | 62 | 88 | 67 |
| Pore-size distribution evaluating factor P | 0.0019 | 0.0021 | 0.0012 |

Porous spinel type ZnO—Al$_2$O$_3$ compound oxides were prepared in the same manner as in EXAMPLES 1–6 except that the above carriers of Type 1 to Type 3 were used (EXAMPLES 7–9). It should be noted that since the carrier of Type 2 is the same as used in EXAMPLES 1–6, EXAMPLE 8 is a repetition of EXAMPLE 2. Table 10 shows some characteristics of the porous spinel type ZnO—Al$_2$O$_3$ compound oxides obtained, including surface area measured by the BET method, average pore diameter and pore volume obtained by means of a mercury porosimeter, and pore-size distribution evaluating factor.

TABLE 10

| EXAMPLES | 7 | 8 | 9 |
|---|---|---|---|
| Type of γ-alumina carrier | Type 1 | Type 2 | Type 3 |
| Average pore diameter (↑) | 108 | 127 | 205 |
| Pore volume (cm³/g-Al$_2$O$_3$)) | 0.60 | 0.62 | 1.18 |
| Surface Area (cm²/g) | 80 | 83 | 108 |
| Pore-size distribution evaluating factor P | 0.0026 | 0.0029 | 0.0020 |

USE EXAMPLE

Porous spinel type compound oxide of the invention was used to prepare catalysts for dehydrogenation of isobutane. More specifically, a specific γ-alumina carrier was caused to carry zinc, and then calcined at high temperature above 600° C. for more than ten hours to make most of its crystal structure become that of the spinel type. The resulting porous spinel type compound oxide carrier was caused to carry alkaline metals and tin to obtain dehydrogenation catalyst A. Also, for the purpose of comparison, the same specific γ-alumina was caused to carry zinc and then calcined, however, to make little of its crystal structure contain that of the spinel type. The resulting non-spinel type compound oxide carrier was used in the same manner to obtain conventional dehydrogenation catalyst B. Note that all the % values below refer to those of weight %.

(1) Preparation of Dehydrogenation Catalyst A

A spinel type ZnAl$_2$O$_4$ compound oxide carrier was prepared in the same manner as EXAMPLE 2. The obtained compound oxide carrier showed the physical properties as listed in Table 11 below.

TABLE 11

| Average pore diameter (↑) | 127 |
|---|---|
| Pore volume (cm³/g) | 0.40 |
| Surface Area (m²/g) | 83 |

Then, the compound carrier was impregnated with 2.0% aqueous solution of chloroplatinic acid $H_2PtCl_6$ to make it carry platinum by 0.3%, which was dried and calcined at 400° C. for 3 hours. Subsequently, the calcined product was impregnated with 1.5% aqueous solution of potassium nitrate $KNO_3$ to make it carry potassium by 1.0% and then dried in an air flow. The dried product was then reduced in a flow of hydrogen gas at 400° C. for 3 hours. Thereafter, the reduced compound carrier now carrying potassium and platinum was impregnated with 0.3% methanol solution of tin (II) chloride $SnCl_2$ to make it carry Sn by 0.7% and then dried. The dried product was then reduced in a flow of hydrogen gas at 400° C. for 30 minutes to obtain catalyst A carrying platinum/potassium/tin.

(2) Preparation of Dehydrogenation Catalyst B

Figure 8:
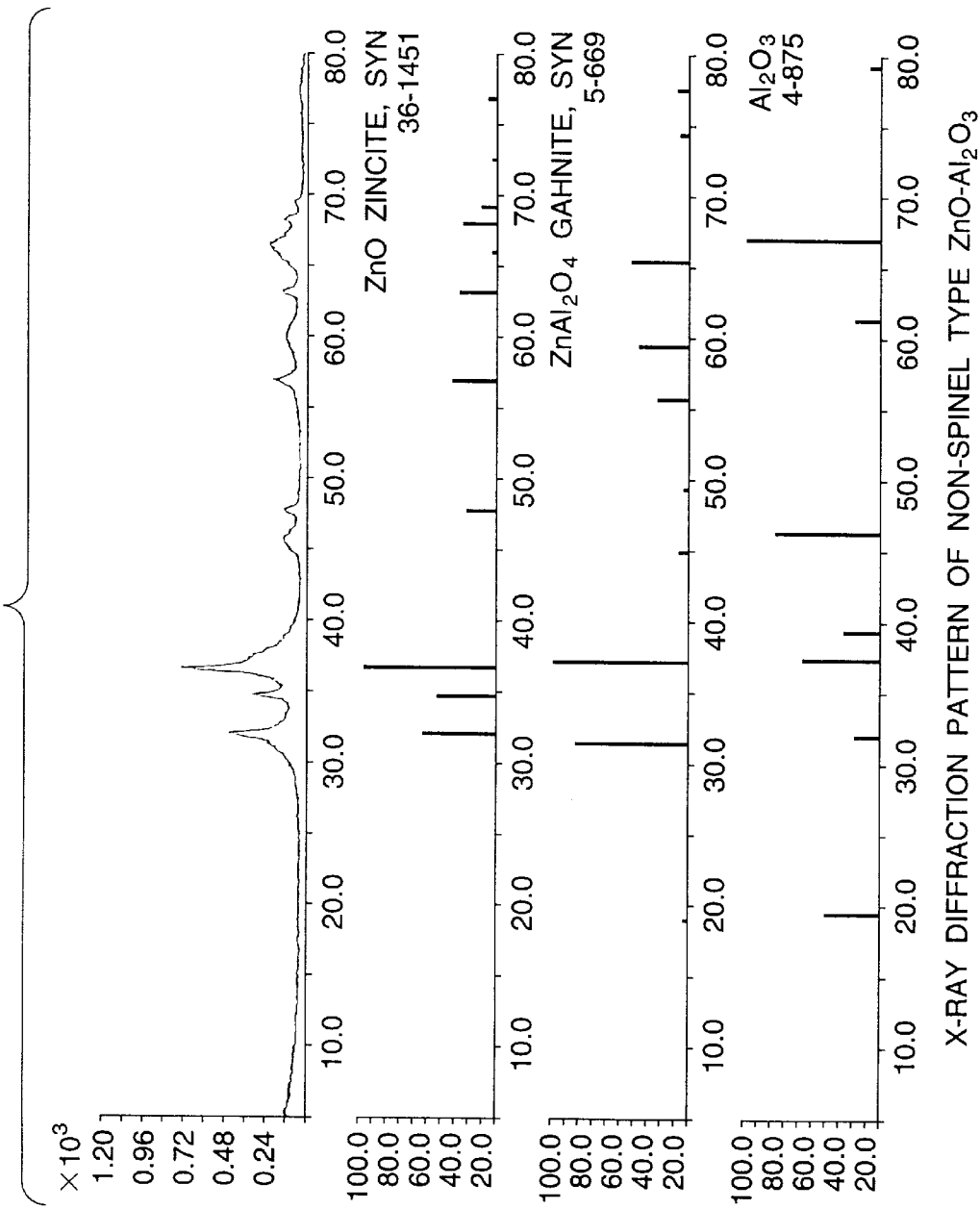
FIG. 8 is an X-ray diffraction pattern of a non-spinel type ZnO—$Al_2O_3$ carrier.

A non-spinel type $ZnO$—$Al_2O_3$ carrier was prepared by impregnating 27.5 g of the γ-alumina carrier obtained in EXAMPLES 1–6 (1) above with 30% aqueous solution of zinc nitrate $Zn(NO_3)_2$ until the ratio by weight of $ZnO/Al_2O_3$ reached 35/65, then drying and calcining the resulting product at 600° C. for 3 hours. Table 12 below and FIG. 8 show the results of an observation of the carrier obtained by utilizing X-ray diffractometry (XRD) and Table 13 below shows some physical properties of the carrier. Table 13 shows the relationship between the incident angle of 2θ and the relative intensity of the highest peak. FIG. 8 shows the diffraction pattern of XRD. As seen from Table 12 and FIG. 8, the carrier had a structure where ZnO covers the surface of $Al_2O_3$.

TABLE 12

| 2θ (deg) | relative intensity (%) |
|---|---|
| 5.5025 | 5.45 |
| 19.3750 | 3.76 |
| 27.5500 | 3.42 |
| 31.8825 | 53.48 |
| 34.4750 | 36.96 |
| 36.2925 | 100.00 |
| 45.5050 | 14.02 |
| 47.5825 | 12.73 |
| 56.6575 | 22.22 |
| 59.4500 | 7.70 |
| 62.9725 | 13.69 |
| 66.3400 | 22.64 |
| 67.9900 | 13.37 |
| 69.2075 | 5.87 |
| 76.9600 | 3.26 | ray source: Cu-$K_{a1}$

TABLE 13

| Average pore diameter (↑) | 98 |
|---|---|
| Pore volume (cm³/g) | 0.413 |
| Surface Area (m²/g) | 110 |

Then, the carrier was impregnated with 2.0% aqueous solution of chloroplatinic acid $H_2PtCl_6$ to make it carry platinum by 0.3%, which was dried and calcined at 400° C. for 3 hours. Subsequently, the calcined product was impregnated with 1.5% aqueous solution of potassium nitrate $KNO_3$ to make it carry potassium by 1.0% and then dried in an air flow. The dried product was then reduced in a flow of hydrogen gas at 400° C. for 3 hours. Thereafter, the reduced carrier now carrying potassium and platinum was impregnated with 0.4% methanol solution of tin (II) chloride $SnCl_2$ to make it carry Sn by 0.7% and then dried. The dried product was then reduced in a flow of hydrogen gas at 400° C. for 30 minutes to obtain catalyst B carrying platinum/potassium/tin.

(3) Experiment on Dehydrogenation Reaction

The above catalyst A and B were filled in respective quartz reaction tubes with a diameter of 18 mm and treated at 600° C. for 3 hours in a flow of hydrogen gas and subsequently purged with a sufficient amount of nitrogen. Thereafter, isobutane was used as feed, to which hydrogen was added by 10% relative to the isobutane feed, and the mixture gas was subjected to an experiment of dehydrogenation reaction at temperature of 520° C. and a space velocity GHSV of 200 hr$^{-1}$ for 300 hours. The gas output of the reaction vessel was analyzed by means of gas chromatography. Table 14 below shows the obtained results.

TABLE 14

| Catalyst | B (non-spinel) | A (spinel) |
|---|---|---|
| Conversion of isobutane (%) | | |
| at 20 hours after start | 33 | 31 |
| at 300 hours after start | 22 | 30 |
| Isobutylene selectivity (%) | | |
| at 20 hours after start | 99 | 99 |
| at 300 hours after start | 99 | 99 |

As clearly seen from Table 14, the dehydrogenation catalyst of the invention can maintain a high catalytic activity and a high selectivity for a prolonged period of time.

As seen from the above table, the present invention provides a porous spinel type oxide having a surface area of more than 80 m²/g and expressed by general formula $MO$—$Al_2O_3$ (M representing a metal having a valence of 2) that can advantageously be used as catalyst or adsorbent or a carrier thereof.

What is claimed is:

1. A porous spinel structure compound oxide showing a surface area per unit weight of not less than 80 m²/g and being expressed by general formula $MO$—$Al_2O_3$, which is obtained by impregnating a γ-alumina carrier with a solution of a compound of metal element M capable of taking a valence of 2, drying the impregnated carrier and calcining it at a temperature of 600° C. or higher, wherein said carrier showing a surface area per unit weight of not less than 150 m²/g, a micro-pore volume per unit weight of not less than 0.55 cm³/g and an average micro-pore diameter between 90 and 200 angstroms, wherein the micro-pores with a diameter between 90 and 200 angstroms thereof taking not less than 60% of the total micro-pore volume.

2. A compound oxide according to claim 1, wherein metal element M of said general formula is magnesium.

3. A compound oxide according to claim 1, wherein metal element M of said general formula is zinc.

4. A compound oxide according to claim 1, wherein metal element M of said general formula is cobalt.

5. A compound oxide according to claim 1, wherein metal element M of said general formula is nickel.

6. A compound oxide according to claim 1, wherein metal element M of said general formula is copper.

7. A compound oxide according to claim 1, wherein metal element M of said general formula includes two or more metal elements with a valence of 2.

8. A compound oxide according to claim 7, wherein said two or more metal elements are magnesium and nickel.

* * * * *